Patented Feb. 16, 1932

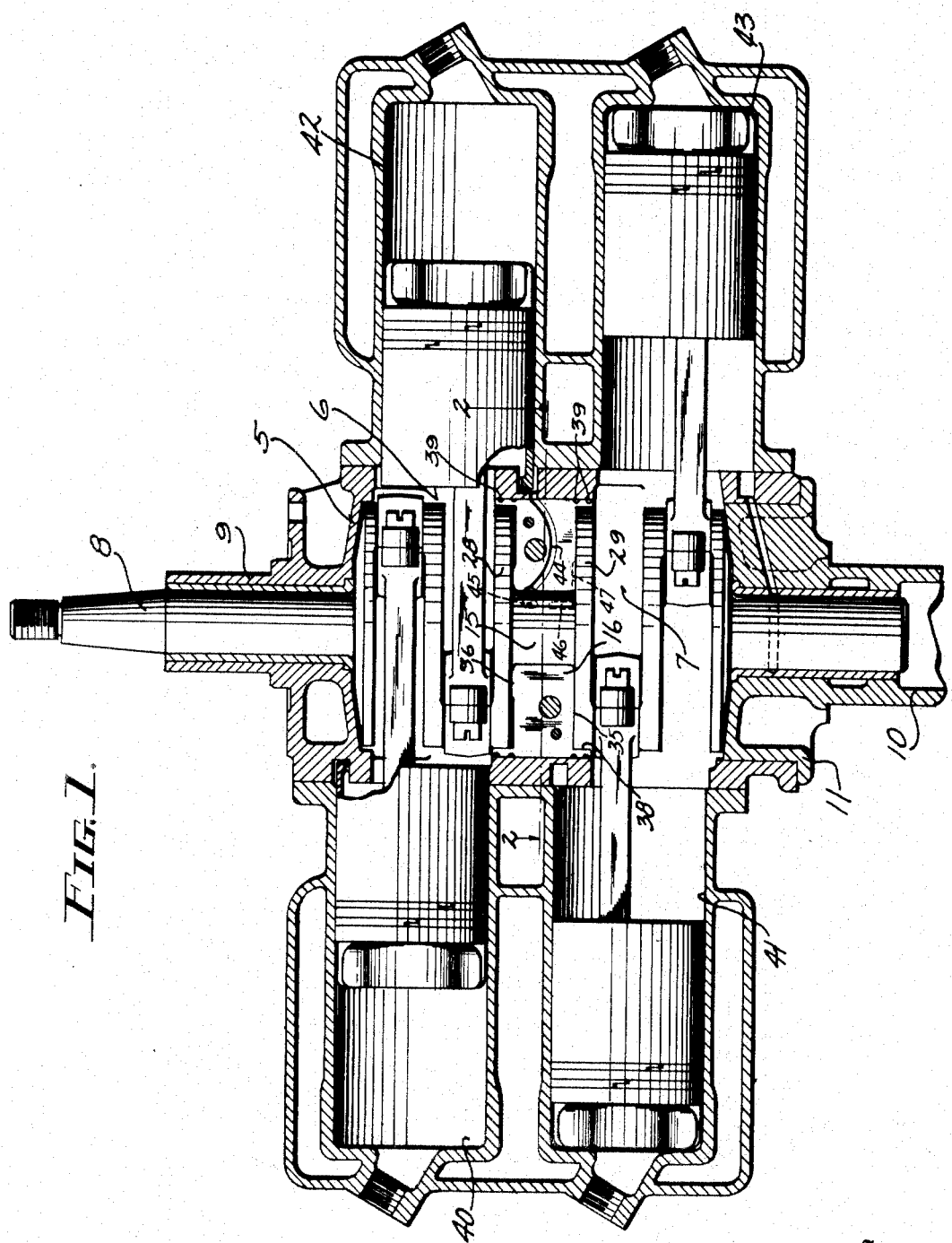

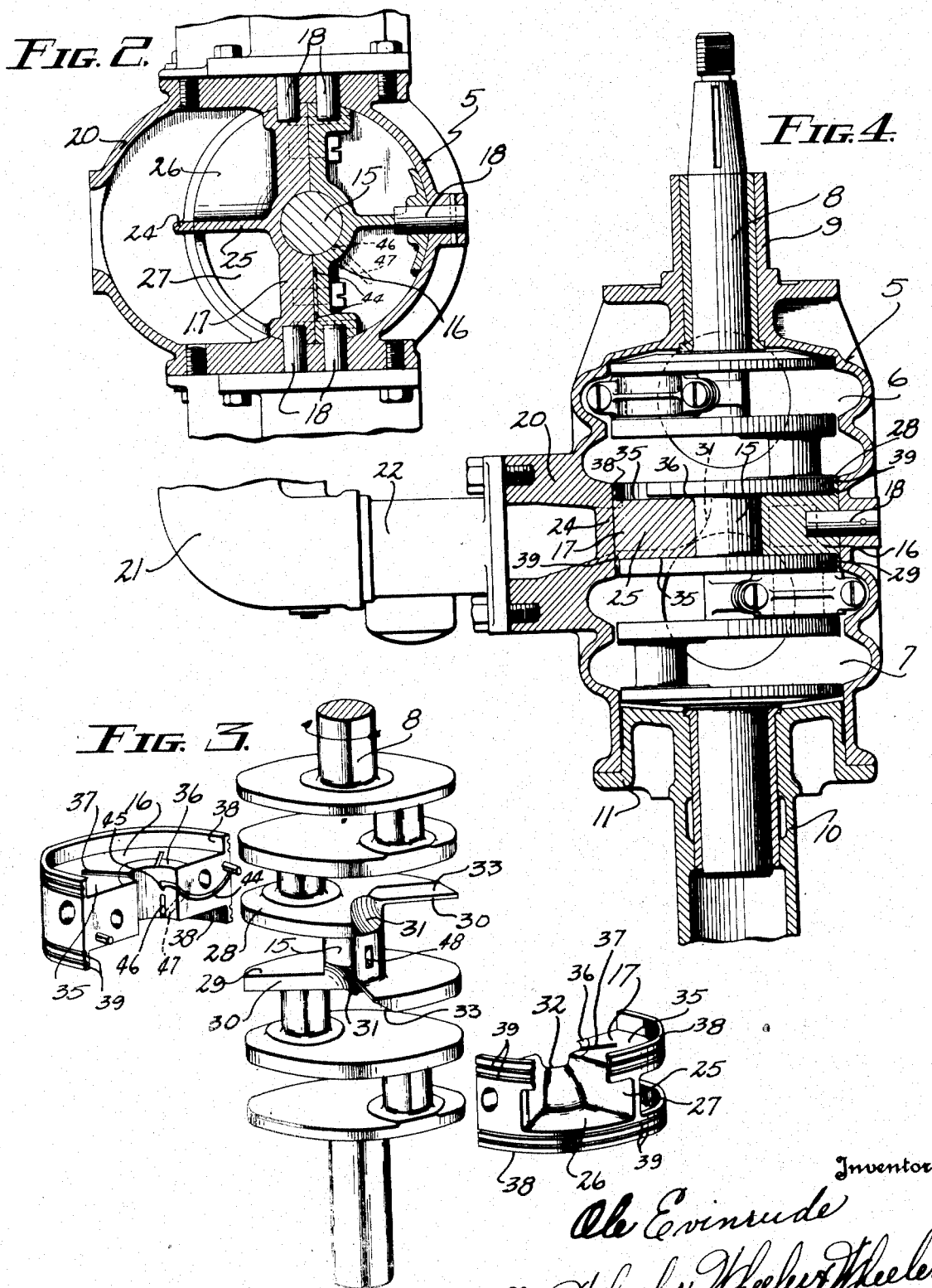

1,845,702

UNITED STATES PATENT OFFICE

OLE EVINRUDE, OF MILWAUKEE, WISCONSIN, ASSIGNOR TO OUTBOARD MOTORS CORPORATION, OF MILWAUKEE, WISCONSIN, A CORPORATION OF MICHIGAN

ROTARY VALVE MECHANISM FOR TWO-CYCLE ENGINES

Application filed July 25, 1930. Serial No. 470,632.

This invention relates to improvements in rotary valve mechanisms for two cycle engines.

I appreciate the fact that it is old to use the crank cheek of an engine crank shaft as a rotary valve to control a port in the end of the crank case adjacent the bearing opening. The present invention relates to a particular structure of this general type, and one object of the present invention is to adapt this form of valve for engines having a plurality of superimposed crank cases by using a portion of the central crank shaft bearing as an intake manifold and valve port.

It is a further important object of the invention to improve volumetric efficiency in an apparatus of this sort by eliminating back pressure attributable to centrifugal force, and by increasing substantially the area of valve opening without increasing the diameter of the valve or the angular opening thereof.

Another object of the invention relates to means for ensuring equal distribution of gases between the two crank cases at all engine speeds (and particularly at low speeds) by dividing the charge before it reaches the valve controlled admission ports.

It is a further important purpose to provide improved means for lubricating the central bearing of a two-crank-case two cycle engine.

In the drawings:

Figure 1 is a vertical axial section through a four-cylinder two cycle engine embodying this invention.

Figure 2 is a transverse section taken in the plane indicated at 2—2 in Fig. 1.

Figure 3 is a view showing in perspective a crank shaft made in accordance with this invention, together with component parts of the central bearing providing valve ports with which the valve cheek portions of the crank shaft co-act as valves.

Figure 4 is a fragmentary detail of the crank shaft, crank case, and valve assembly in axial section in a plane at right angles to that in which Fig. 1 is taken.

Like parts are identified by the same reference characters throughout the several views.

The engine assembly may in general be very similar to that disclosed in my co-pending application 257,501 filed February 27, 1928 and relating to a central bearing construction for a four-cylinder crank shaft.

The crank case casting 5 provides separate crank cases 6 and 7 for the superimposed pairs of cylinders comprising the engine. While I have shown the crank shaft 8 provided with a pair of cranks in each of the crank cases 6 and 7, it will be obvious to those skilled in the art that a single crank may be provided in each crank case if it is desired to use the invention in connection with an engine having only two cylinders respectively registering with the crank cases 6 and 7.

The crank case casting 5 is so designed as to provide at 9 an integral bearing sleeve fitted with the usual bushing. A corresponding sleeve at 10 is mounted on a removable closure 11 for the end of the crank case casting. Except for this closure the entire crank case assembly comprises a single unitary casting into which the crank shaft and central bearing may be introduced before the closure 11 is put in place.

The central portion of the crank shaft is somewhat elongated at 15 to receive support from a central bearing comprising bearing sections 16 and 17, which are united on a transverse diameter of the crank casing. Dowel pins are used to maintain proper registry between the component sections of the bearing, and an anchorage pin at 18 holds the bearing properly positioned with respect to the crank case.

In accordance with this invention the intermediate portion of the crank case casting 5 is extended and interiorly hollowed out to provide a manifold 20 to which the carburetor 21 is attached by means of fitting 22. It will be noted that the interior dimension of the manifold is enlarged to approximately the diameter of the composite bearing member comprising sections 16 and 17. A vertical web at 24 divides the manifold passage, serves to confine the bearing section 17, and registers with a corresponding web at 25 which separates compartments 26 and 27 in the bearing member 17. This web divides the charge and separates the ports, thereby tending to ensure equal distribution of mixture to the crank cases at all engine speeds.

Compartment 26 in bearing member 17 not only opens into manifold 20 as shown in Figs. 2 and 3, but also provides an upwardly opening port leading to crank case 6. Compartment 27 in the same bearing section is likewise adapted to receive gas from manifold 20, but provides a downwardly opening port leading to crank case 7.

Controlling the gas admission ports provided by compartments 26 and 27 of bearing member 17, are rotary valves which, for convenience, comprise the central cheek portions 28 and 29 of the crank shaft 8. Each of these central cheek portions is segmentally cut away at 30, at best shown in Fig. 3, and it is particularly to be noted that the segmental cut is extended at 31 into the crank shaft proper, which is made sufficiently heavy so that the extent of metal connection at other points about this axis with each segmentally cut cheek will compensate for any loss of strength attributable to the port extensions 31.

It will be noted that in registry with the port extensions 31 the bearing walls of section 17 are relieved or cut away, as shown at 32 in Fig. 3.

Since engines of this type, particularly in outboard motor practice, operate at very high speeds it is important from the standpoint of lubrication to keep the peripheral speed of moving parts as low as possible. These considerations place a definite limitation on the diameter of the crank cheeks 28 and 29 and hence, in order to obtain an increase of valve capacity without changing the angular degree of valve opening, the provision of the segmental cuts 31 in the crank shaft portion 15 becomes of great significance. Tests indicate that it has a very great practical value out of all proportion to the apparent increase in dimension of the port.

Another factor of importance in the present design is the beveled edge 33 upon the leading margin of each of the crank cheeks 28 and 29 in their direction of rotation. In order to explain the purpose of this bevel it is desirable to emphasize, first, the fact that in the construction illustrated the member 17 is stationary and the valve disks comprising cheek portions 28 and 29 of the crank shaft operate across axially extending ports instead of radially extending ports. This important feature eliminates back pressure due to centrifugal force, which would be developed if the members 16 and 17 were in rotation with the crank shaft to interact with stationary ports at their peripheries. By reason of the design herein disclosed, centrifugal force is as much eliminated as would be the case if each of the crank cases 6 and 7 comprised corresponding parts of entirely separate engines each engine controlled by its own crank cheek valve.

Of course the crank cheek valve portions 28 and 29 of the crank shaft have material thickness and tend to some degree to develop a centrifugal force in the gases acted on by their leading margins in the direction of crank shaft rotation. The gas acted on by these leading margins, however, will not have any substantial tendency to flow backward through the admission port, and to further improve the operation of the device in eliminating back pressure, the leading margins of the crank cheek valve portions 28 and 29 are beveled at 33 so that in acting on the gas they will tend rather to force it into the respective crank cases instead of forcing it backwardly through the admission ports.

It will be noted that each of the sections 16 and 17 of the intermediate bearing is provided with a flat end face 35 for the respective crank cheek disks 28 and 29. Since the engine disclosed has a vertical crank shaft it is very desirable that the vertical thrust be absorbed by an adequately lubricated surface, and for this reason there is an almost imperceptibly raised annular zone at 36 in the upper face of the intermediate bearing sections traversed by radial oil grooves 37, as shown in Fig. 3. In addition, the intermediate bearing is provided at both top and bottom with an annular flange 38 encircling the respective crank cheek disks 28 and 29.

The disclosed arrangement is such that some of the oil carried by the gas admitted to the upper crank case 6 is deposited within the annular flange 38, and forms a film on surface 35 supplemented by the surplus oil delivered centrifugally through grooves 37 from the central crank shaft bearing. Not only is lubrication adequately provided, but an oil seal is established between crank cases 6 and 7. An oil seal is also provided between the exterior of the composite bearing members 16 and 17, by grooving it peripherally as shown at 39.

The supply of oil for direct lubrication is augmented by that which flows onto the upper face of the bearing member from cylinder 40 in which some of the oil customarily mixed with the fuel for two cycle engines will be deposited. This cylinder and cylinder 41 are so disposed as to drain into the respective crank cases 6 and 7.

The other two cylinders, 42 and 43, are lower, due to the crank offset and it will be noted that adjacent the lowest point of each a drain hole for oil leads through the crank case to the adjacent crank shaft bearing. In the case of cylinder 42 the oil duct may conveniently be extended across bearing member 16 by arcuately grooving its parting face at 44 with an end mill and opening the duct to the bearing surface at 45. An axially aligned recess in the bearing surface is provided at 46 and communicates with a radial groove in the lower surface of the bearing member 16 at 47. The crank shaft has a short peripheral slot 48 which registers with recesses 45 and 46 at a time when compression chamber 6 is under pressure and chamber 7 is under partial vacuum. This arrangement positively ensures delivery of lubricant through the bearing from the low portion of cylinder 42. In the case of cylinder 43 drainage is primarily by gravity to the bearing in sleeve 10.

It so happens that the valve opening required in the particular engine disclosed is approximately 180 degrees of crank shaft rotation. This is provided for by ports 26 of approximately 90 degrees extent and sector-shaped valve openings 30 in the crank cheek disks of similar extent. A 90 degree valve opening, in traversing a 90 degree port, will give a total of approximately 180 degrees of opening.

Since the two ports are necessarily offset by approximately 90 degrees, and the two valve disks have their respective sector-shaped openings offset approximately 90 degrees in the same direction of crank shaft rotation, it will be obvious that the port leading to crank case 7 will be uncovered approximately 180 degrees in advance of the port leading to crank case 6. In other words, the two crank cases will receive their respective charges alternatively, and the flow of gas will be fairly continuous through pipe 22 and manifold 20, leading first to one of the ports and then to the other.

As above noted, there is little or no back pressure attributable to the use of the rotary valve and, in fact, some acceleration of the charge into the crank case is believed to result from the use of the beveled margins 33 of the crank cheeks 28 and 29. The result of this feature, and the result of the extension into the crank shaft proper of the sector-shaped cuts at 31, is to produce an extremely high volumetric efficiency in engines embodying this invention as compared with any other rotary valve engines using crank shaft valves.

I claim:

1. A two cycle engine comprising the combination with a crank case provided with crank shaft bearings and a port opening axially into the crank case, of a crank shaft having a valve member co-acting with said port for the control of flow therethrough, said member having an opening registerable with said port in the rotation of the shaft and extending into the projected diameter of the shaft.

2. An engine having crank case compression and comprising the combination with an axially ported crank case having crank shaft bearings through one of which with angularly spaced substantially radial sides the port extends, of a crank shaft having a crank rotatable within said case of which a portion constitutes a valve member co-acting with the ported end of the case to control admission of fluid through said port to the interior of the case, said crank portion having a sector-shaped opening registerable with the port and extending into the projected diameter of the shaft.

3. An engine having crank case compression, said engine comprising the combination with a crank case having opposed bearings and a port extending axially through one of said bearings and centrally through the inner wall thereof, a crank shaft in said bearings having a crank cheek rotatable in said case and constituting a valve co-acting with the end of the case to control the port therein, said cheek having an opening registerable with the port of said crank case and extending across a portion of the shaft whereby to receive fluid through that portion of the port which opens inwardly of the bearing.

4. A two crank case engine having crank shaft bearings at its ends and an intermediate crank shaft bearing between the two crank cases, a first passage leading from the periphery of said intermediate bearing axially into one crank case at one side of a diameter of said bearing, a second passage leading from the periphery of said bearing axially into the other crank case at the opposite side of said bearing diameter, a manifold communicating substantially symmetrically with the respective passages at the periphery of the bearing, and a crank shaft mounted in the several bearings and provided with disk valve members co-acting with the end faces of said intermediate bearing to provide valves for controlling the flow of gases through the axially extending ports into the respective crank cases.

5. A two crank case engine having crank shaft bearings at its ends and an intermediate crank shaft bearing between the two crank cases, a first passage leading from the periphery of said intermediate bearing axially into one crank case at one side of a diameter of said bearing, a second passage leading from the periphery of said bearing axially into the other crank case at the opposite side of said bearing diameter, a manifold communicating substantially symmetrically with the respective passages at the periphery of the bearing, and a crank shaft mounted in the several bearings and provided with disk valve members co-acting with the end faces of said intermediate bearing to provide valves for controlling the flow of gases through the axially extending ports into the respective crank cases, said ports being bounded by substantially radial walls of said intermediate bearing intersecting the bearing surface, and said disks having corresponding openings intersecting the projected periphery of the shaft and registerable with the respective ports during crank shaft rotation.

6. An engine having a crank case provided with a plurality of compression chambers and an intermediate member, said intermediate member having openings at opposite sides of a given diameter leading from its periphery axially into the respective compression chambers, a crank shaft rotatable in the crank case and provided with crank cheek disks overlying the ends of the intermediate member and having openings angularly offset whereby to register consecutively with the respective ports through said member.

7. An engine having a crank case provided with a plurality of compression chambers and an intermediate bearing, said intermediate bearing having openings at opposite sides of a given diameter leading from its periphery axially into the respective compression chambers, a crank shaft rotatable in the crank case and provided with crank cheek disks overlying the ends of the intermediate bearing and having openings angularly offset whereby to register consecutively with the respective ports through said bearing, said ports being offset approximately 90 degrees and the complementary openings in the respective crank disks being offset approximately 90 degrees additional whereby said openings register with their respective ports at approximately 180 degrees separation in the rotation of such shaft.

8. A crank case provided with a plurality of chambers into which a crank shaft is bodily positionable, a two part bearing for said shaft adapted to fit an intermediate portion of the crank case and constitute an intermediate bearing for the shaft dividing the crank case into two compression compartments, passages leading through the periphery of said intermediate bearing in opposite axial directions into the respective crank case compartments and penetrating the bearing walls thereof, and a crank shaft rotatable in said crank case having crank cheek disks co-acting with the ends of the intermediate bearing and provided with apertures respectively registerable with the passages of said bearing to control admission of gases into the respective compartments, said crank cheek openings being extended into the shaft itself in registry with the ports of said passages which cross the bearing wall of said intermediate bearing.

9. An engine comprising a crank case having end bearings of which one is removable to permit the insertion of the crank shaft bodily, a crank shaft rotatable within said bearings and provided with an intermediate bearing portion, parts of which are cut away within the projected periphery of said shaft, crank cheeks at opposite sides of said intermediate bearing portion having sector shaped openings extending outwardly from the cut away portions of the shaft, and a fixed central bearing member fitted to said shaft and anchored to an intermediate portion of the crank case to sub-divide its end portions into two distinct compression compartments, said member having ports at opposite sides of a transverse diameter leading from the periphery of said member centrally and axially to the respective compartments and the cut away portions of the shaft rotatable therein, together with a manifold disposed symmetrically with reference to said diameter and comprising a conduit for gases, said cheeks being arranged to co-act with the ends of said intermediate bearing member to control the admission of such gases to the respective compartments.

10. As a new article of manufacture, an intermediate bearing member having a central web in a radially axial plane, and passages leading from its periphery at opposite sides of said web in a central and axial direction to opposite ends of the bearing member, said bearing member comprising a plurality of sections sub-divided transversely with respect to said web and having a composite cylindrical opening, parts of which are located in the respective sections.

11. As a new article of manufacture, a stationary intermediate bearing member for a two crank case engine, said member having a central bearing opening and passage means leading from its periphery and extending axially through its opposite faces, a portion of said passage means intersecting each end of the wall of said bearing opening.

12. As a new article of manufacture, a stationary intermediate bearing member for a two crank case engine, said bearing member comprising a block having parallel end faces and a central bearing opening, passage means extending from the periphery of said member toward the center thereof and opening axially to each end, and a peripheral annular flange surrounding each of said end faces.

13. As a new article of manufacture, a crank shaft having a central bearing portion terminating in integral crank cheek disks, said disks having openings bounded by substantially radial lines.

14. As a new article of manufacture, a crank shaft having a central bearing portion terminating in integral crank cheek disks, said disks having valve openings extended into the respectively contiguous ends of said central bearing portion.

15. The combination with an engine having a plurality of separate crank cases, of a single crank shaft rotatable in said crank cases and provided with crank cheek valve disks with angularly offset sector-shaped openings, and mixture supply means between said crank cases, said crank cases being axially ported to afford communication between said supply means and said crank cases under the control of said valve disks.

16. In an engine the combination with a plurality of separate crank cases in axial alignment and provided with bearing portions in their adjacent ends and sector-shaped ports in such ends intersecting the bearing wall thereof, of a single crank shaft rotatable in said crank cases and provided with crank cheek valve disks co-acting with the respective casing ends aforesaid and provided with openings alternately registerable with said ports, said crank disk openings extending into the projected periphery of the shaft in registry with the port extension intersecting the bearing wall.

17. An engine comprising the combination with a crank case having an axially opening port in its end, of a crank shaft rotatable in said crank case and provided with valve disk co-acting with the ported end thereof, said disk having an opening bounded by angularly spaced margins of the disk, the margin of said disk at the rear of the opening therein being beveled inwardly.

18. An engine comprising the combination with upper and lower crank cases and an intermediate bearing member having spaced upper and lower recesses in its bearing surface communicating with the respective crank cases, of a duct for lubricant leading to the upper of said recesses, and a crank shaft rotatable in said crank cases and bearing member and provided with a peripheral slot adapted in the course of crank shaft rotation to register simultaneously with said recesses, whereby to afford momentary communication therebetween for the delivery of lubricant.

19. In a two cycle engine the combination with axially aligned crank cases, of an intervening bearing member comprising a plurality of complementary parts having faces joined in a radial plane, one of said parts providing intake ports leading to the respective crank cases, and the other of said parts having an oil groove in its said face, an upper recess in its bearing surface communicating with said groove, and a lower recess in its bearing surface leading axially therethrough, and a crank shaft rotatable in said crank cases and the bearing provided by the composite parts of said member, said shaft having valve disks co-acting with the respective ports of said first mentioned part, and a slot in the periphery of its bearing surface registerable with the respective recesses of the second mentioned part, said duct being arranged to receive pressure and lubricant from the crank case thereabove.

20. In a two cycle engine, the combination with a crank case and horizontal cylinder adapted to receive lubricant therefrom, of a bearing in said crank case provided with a recess communicating with said cylinder at a low point therein, a piston reciprocable in said cylinder and adapted in reciprocation to vary the pressure to which said recess is subject, and a crankshaft rotatable in said bearing and provided with a slot adapted to receive lubricant from said recess.

21. In a two cycle engine, the combination with a crank case and a horizontal cylinder adapted to receive lubricant therefrom, of a bearing in said crank case provided with a recess communicating with said cylinder at a low point therein, a piston reciprocable in said cylinder and adapted in reciprocation to vary the pressure to which said recess is subject, and a crankshaft rotatable in said bearing and provided with a slot adapted to receive lubricant from said recess, said slot being timed to register with said recess when the piston subjects lubricant therein to pressure, and said bearing having an escape duct with which the slot is simultaneously registerable for the relief of pressure in said slot.

22. In a two cycle engine, the combination with a crank case having a pair of axially aligned crank chambers and an intervening bearing, of a crank shaft having a bearing portion in said bearing and crank cheek valve disks abutting the ends thereof, said bearing providing sector shaped ports substantially equal in radius to said bearing and having substantially radial boundaries, and said disks providing registering openings complementary to said ports.

23. In a two cycle engine, the combination with a crank case, of a bearing partition removably positioned therein and provided with radial passage means opening axially into crank chambers at each end of said partition, and a crank provided with valve means in each such chamber complementary to said bearing partition and controlling said openings.

OLE EVINRUDE.